United States Patent
Wright et al.

(10) Patent No.: US 11,138,486 B1
(45) Date of Patent: Oct. 5, 2021

(54) CARDHOLDER SLEEVE WITH SELECTABLE WIRELESS COMMUNICATION CAPABILITIES

(71) Applicant: Wells Fargo Bank, N.A., San Francisco, CA (US)

(72) Inventors: John T. Wright, Benicia, CA (US); Kristine Ing Kushner, Orinda, CA (US)

(73) Assignee: Wells Fargo Bank N.A., San Francisco, CA (US)

( * ) Notice: Subject to any disclaimer, the term of this patent is extended or adjusted under 35 U.S.C. 154(b) by 0 days.

(21) Appl. No.: 16/578,110

(22) Filed: Sep. 20, 2019

(51) Int. Cl.
*G06K 19/073* (2006.01)
*G06K 7/10* (2006.01)

(52) U.S. Cl.
CPC ... *G06K 19/07318* (2013.01); *G06K 7/10297* (2013.01)

(58) Field of Classification Search
CPC ............... G06K 19/07318; G06K 7/10297
USPC .......................................................... 235/492
See application file for complete search history.

(56) References Cited

U.S. PATENT DOCUMENTS

| 6,128,604 | A | * | 10/2000 | Sakamaki | G06K 7/0013 |
| | | | | | 705/41 |
| 6,155,410 | A | * | 12/2000 | Davis | A45C 11/182 |
| | | | | | 150/147 |
| 6,336,586 | B1 | | 1/2002 | Shriver | |
| 7,980,458 | B2 | * | 7/2011 | Kon | G06Q 20/10 |
| | | | | | 235/375 |
| 9,192,217 | B1 | * | 11/2015 | Vargas | A45C 1/06 |
| 9,256,768 | B2 | | 2/2016 | Gluck | |
| 9,344,154 | B2 | | 5/2016 | Wendling et al. | |
| 9,779,398 | B2 | | 10/2017 | Peterson et al. | |

(Continued)

FOREIGN PATENT DOCUMENTS

| CN | 202476717 U | 10/2012 |
| CN | 107784497 A | 3/2018 |
| GB | 2528316 | 1/2016 |

OTHER PUBLICATIONS

Silbert, S., "Pay with Your Pebble Watch with This Smartstrap—A Third-Party Accessory Brings Mobile Payments to Three Pebble Devices", Lifewire, Sep. 5, 2018, 2 pages.

(Continued)

*Primary Examiner* — Michael G Lee
*Assistant Examiner* — David Tardif
(74) *Attorney, Agent, or Firm* — Shumaker & Sieffert, P.A.

(57) ABSTRACT

A cardholder sleeve with selectable wireless communication capabilities is described. The cardholder sleeve includes two or more slots each configured to hold an integrated chip card. Each of the slots is surrounded by shielding material to shield the communication features of the card from skimming and prevent interference with other cards in the sleeve. The cardholder sleeve includes an internal card reader for each of the cards and a selection mechanism that enables a user to select a card in the cardholder sleeve for use. The cardholder sleeve further includes at least one transceiver in communication with the internal card readers that operates as a repeater to wirelessly transmit information read from the chip of the selected card by the respective internal card reader to external card readers such that the selected card need not be removed from the sleeve to be used.

19 Claims, 7 Drawing Sheets

(56) References Cited

U.S. PATENT DOCUMENTS

| | | | |
|---|---|---|---|
| 9,907,375 B1* | 3/2018 | Kitchen | A45C 13/005 |
| 10,185,955 B1* | 1/2019 | Koeppel | G06Q 20/3278 |
| 2009/0039121 A1 | 2/2009 | Paul | |
| 2012/0239514 A1 | 9/2012 | MacGillivray et al. | |
| 2013/0317924 A1 | 11/2013 | Bush et al. | |
| 2013/0325712 A1 | 12/2013 | Park et al. | |
| 2017/0011381 A1 | 1/2017 | Silvestre et al. | |
| 2018/0158048 A1 | 6/2018 | Narasimhan et al. | |
| 2019/0066089 A1 | 2/2019 | Miryala et al. | |
| 2019/0102766 A1 | 4/2019 | Koeppel et al. | |
| 2020/0210994 A1 | 7/2020 | Sauer et al. | |

OTHER PUBLICATIONS

Majumder, A. et al., "Pay-Cloak: A Biometric Back Cover for Smartphones Facilitating secure contactless payments and identity virtualization at low cost to end users." IEEE Consumer Electronics Magazine, Mar. 15, 2017, 11 pages.

Luthi, B. "As credit cards go contactless, can RFID-blocking wallets protect your data?" Retrieved from https://www.creditcards.com/credit-card-news/rfidblocking-wallet-worth-it/., Apr. 9, 2019, 4 pages.

U.S. Appl. No. 16/654,649, filed Oct. 16, 2019, naming inventors Kushner et al.

* cited by examiner

CARDHOLDER SLEEVE WITH SELECTABLE WIRELESS COMMUNICATION CAPABILITIES

TECHNICAL FIELD

The invention relates to a cardholder sleeve for integrated circuit chip cards and methods for securing the same.

BACKGROUND

Credit cards have long provided card holders with a convenient payment option at a majority of merchants. Credit cards include unique information that links the card to a card holder's account with a financial institution (e.g., a bank or a non-bank card issuer). For example, in the case of a traditional credit card, the account may comprise an amount of credit available to the card holder, or in the case of a debit card, the account may comprise a checking or savings account that belongs to the card holder. Credit cards typically include the card holder's name, the account number, an expiration date, and a card security code (CSC) (alternatively referred to as a card verification value (CVV) or card verification code (CVC)) printed or embossed on the physical card.

Credit cards may also include a magnetic stripe or an integrated circuit (IC) that is attached to the physical card and encoded with the unique information. In the case of a chip-enabled card, the IC embedded on the card may be configured to store additional information and/or perform processing tasks that exceed the capabilities of a magnetic stripe. For example, a single chip-enabled card may be programmed with multiple financial account credentials, insurance information, and personal identification information. In some examples, these chip-enabled cards may comprise contact cards that include a pattern of metal contacts to electronically connect (e.g., couple) a card reader to the IC when the contact card is physically inserted into the card reader. Contact cards may use a personal identification number (PIN) and/or cryptographic algorithms to authenticate a user or a transaction. Example contact cards include identification cards (e.g., passports), financial cards (e.g., debit and credit cards), subscriber identity module (SIM) cards, or access cards such as transit cards or employee badges that store information on the IC for access to transit stops, vehicles, facilities, or any other area that requires particular access rights. Chip-enabled cards may also comprise contactless cards that wirelessly transmit financial and/or other data via one or more antennas embedded on the card. For example, a contactless card may transmit data via a short-range antenna or a long-range antenna on the card. Like contact cards, contactless cards may use a PIN and/or cryptographic algorithms to authenticate a user or a transaction. Examples of contactless cards include identification cards, financial cards, access cards, or any other card that could otherwise be implemented with a magnetic stripe or a contact IC.

SUMMARY

In general, this disclosure describes a cardholder sleeve with selectable wireless communication capabilities. The cardholder sleeve is configured to hold two or more integrated circuit chip cards and, for each of the cards, shield the communication features of the card unless selectively activated by a user. The cardholder sleeve described in this disclosure may increase the security and general ease of use of cards that store data on one or more integrated chips housed within the cards. The cardholder sleeve includes two or more slots each configured to hold a card. Each of the slots is surrounded by shielding material to shield the communication features of the card from skimming and prevent interference with other cards in the sleeve. According to the disclosed techniques, the cardholder sleeve includes an internal card reader for each of the cards and a selection mechanism that enables a user to select a card for use. The cardholder sleeve further includes at least one transceiver in communication with the internal card readers that operates as a repeater to wirelessly transmit information read from the chip of the selected card by the respective internal card reader to other devices (e.g., external card readers) such that the selected card need not be removed from the sleeve to be used.

In some examples, one or more internal card readers comprise contactless card readers configured to perform near-field communication (NFC) or other short-range communication with to the integrated circuit (IC) embedded in the contact card. In some examples, one or more internal card readers comprise contact card readers configured to come in contact with a pattern of metal contacts on the contact card to electronically couple the card reader to the IC embedded in the contact card. In this way, a cardholder sleeve in accordance with techniques of this disclosure may enable information read from a contact card to be wireless communicated to an external card reader, essentially enabling the contact card to be used as a contactless card without having to remove the contact card from the sleeve.

In one example, this disclosure is directed to a cardholder sleeve including a plurality of slots where each slot of the plurality of slots is configured to hold a card with an integrated circuit chip, shielding material embedded in each of the plurality of slots to block interrogating signals, a plurality of internal card readers where each of the plurality of internal card readers is positioned at each of the plurality of slots, a transceiver, and at least one user interface configured to receive input from a user to select a respective card held in a respective slot of the plurality of slots by electrically coupling the transceiver to a respective internal card reader positioned at the respective slot. The transceiver is configured to, in response to receiving interrogating signals from an external card reader, activate the respective internal card reader to read information from the integrated circuit chip of the respective card and transmit the information to the external card reader.

In another example, this disclosure is directed to a method including receiving, at a user interface of a cardholder sleeve comprising a plurality of slots, user input to select a respective card held in a respective slot of the plurality of slots by electrically coupling a respective internal card reader from a plurality of card readers configured on the plurality of slots to a transceiver of the cardholder sleeve, and receiving, at the transceiver of the cardholder sleeve, interrogating signals from an external card reader. The method further includes in response to receiving the interrogating signals, activating the respective internal card reader to read information from the respective card held in the respective slot corresponding to the respective internal card reader, and transmitting, by the transceiver of the cardholder sleeve, the information to the external card reader.

In another example, this disclosure is directed to a cardholder sleeve including a plurality of slots where each slot of the plurality of slots is configured to hold a card with an integrated circuit chip, shielding material embedded in each of the plurality of slots to block interrogating signals, a plurality of internal card readers where each of the plurality of internal card readers is positioned at each of the plurality of slots, including a first internal card reader positioned at a first slot and a second internal card reader positioned at a second slot, a plurality of transceivers, where each of the plurality of transceivers is positioned at each of the plurality of slots, and a plurality of slot user interfaces configured to receive input from a user to select a respective card held in a respective slot of the plurality of slots by electrically coupling a respective transceiver of the plurality of transceivers positioned at the respective slot to the first internal card reader positioned at the respective slot. Each of the plurality of transceivers is configured to, in response to receiving interrogating signals from an external card reader, activate only the respective internal card reader to read information from the integrated circuit chip of the respective card and transmit the information to the external card reader.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
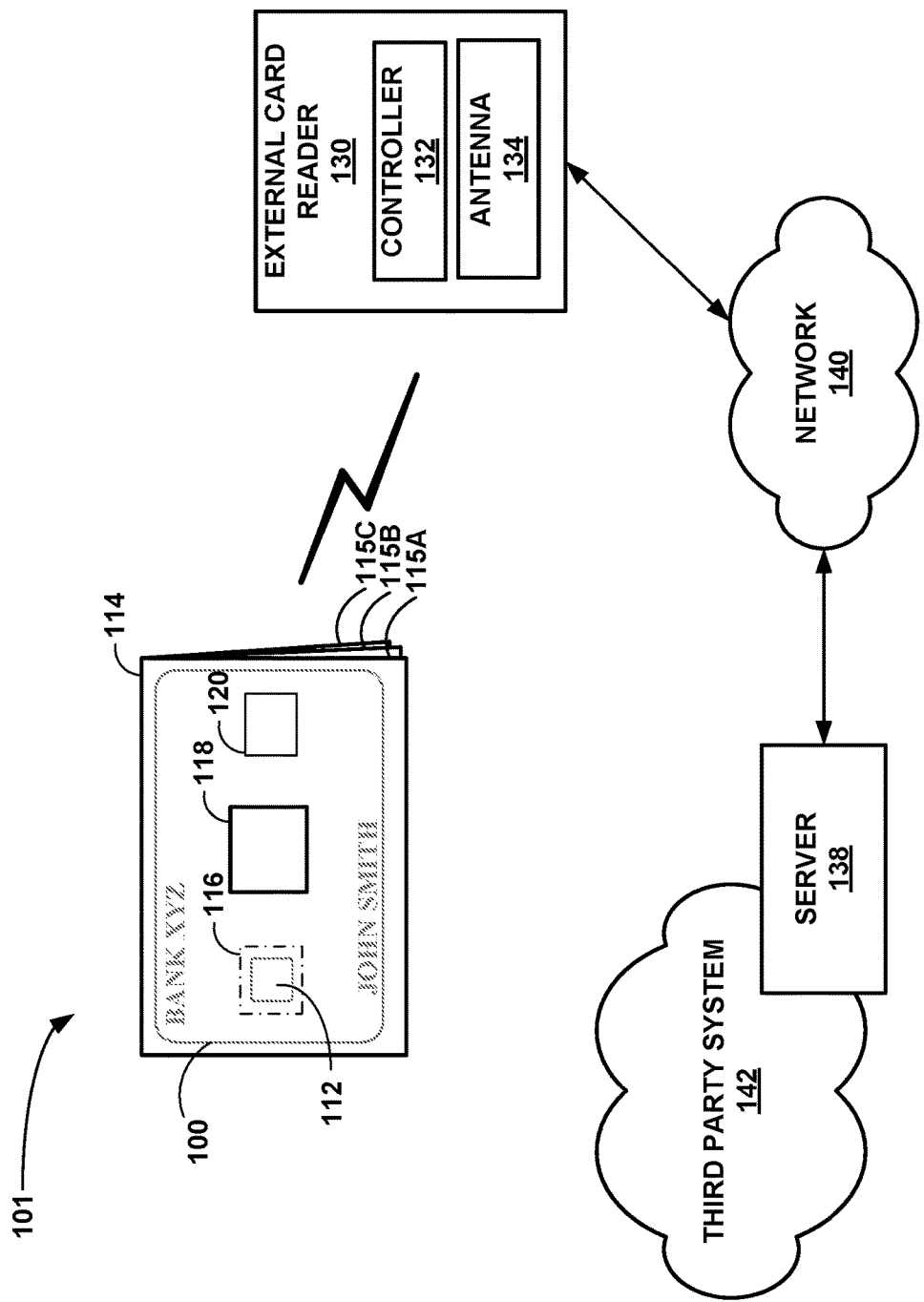
FIG. 1 is a block diagram illustrating a system that includes a cardholder sleeve with selectable wireless communication capabilities for communicating with an external card reader, in accordance with the techniques of this disclosure

Aspects of the disclosure are related to a cardholder sleeve configured to hold two or more integrated circuit (IC) chip cards and, for each of the cards, shield the communication features of the card unless activated by a user. IC chip cards may be programmed with financial account information, insurance information, personal identification information, and/or configured to perform processing tasks that exceed the capabilities of a magnetic stripe. In some examples, IC chip cards may comprise contact cards that include a pattern of metal contacts to electronically connect (e.g., couple) a card reader to the IC when the contact card is physically inserted into the card reader. In some examples, IC chip cards use a PIN and/or cryptographic algorithms to authenticate a user or a transaction. Example contact cards include identification cards (e.g., passports), financial cards (e.g., debit and credit cards), subscriber identity module (SIM) cards, or access cards such as transit cards or employee badges that store information on the IC for access to transit stops, vehicles, facilities, or any other area that requires particular access rights.

IC chip cards may also comprise contactless cards that wirelessly transmit financial and/or other data via one or more antennas embedded on the card. For example, the contactless cards may transmit financial data via a short-range antenna or a long-range antenna on the card to enable a user of the card (hereinafter referred to as a cardholder) to complete a financial transaction without having to physically swipe the card or even take the card out of a wallet. For example, the card may be used to complete a financial transaction by orienting the card within a certain proximity of or tapping the card on an external card reader of a merchant device (e.g., a point-of-sale (POS) device used by a merchant to execute and record transactions). The merchant device may be able to remotely activate and draw information from the card when the antenna of the card is properly oriented relative to the merchant device using near-field communications (NFC) or other short-range communication protocols. Other examples of contactless cards include transit cards, employee badges, or any other card that could otherwise be implemented with a magnetic stripe or a contact IC.

In some examples, malicious third parties may attempt to use the remotely activatable nature of a contactless card to covertly activate and steal the information of the card. For example, a malicious third party may stand near a busy intersection with an NFC enabled device configured to remotely activate any cards that come within a vicinity of the device, pulling in and storing any data from the cards of passersby. Such activity is called "card skimming." Malicious third parties may attempt to steal data of a card with the hopes of fraudulently using this information to execute future illicit transactions or to gain access to an area that requires particular access rights. In certain examples, a cardholder may place the card in a cardholder sleeve with embedded shielding material to block interrogating signals (including malicious skimming signals). In this way, the cardholder sleeve may impede or eliminate the ability of a malicious third party to steal data from one or more contactless cards within the cardholder sleeve. Storing a contactless card within a cardholder sleeve with embedded shielding material, however, can eliminate some of the convenience of the card. For example, enclosing the card within the cardholder sleeve may make it difficult or impossible for a cardholder to use the card without having to take the card out of the sleeve.

Aspects of the disclosure relate to a cardholder sleeve comprising a plurality of slots with shielding material embedded in each of the plurality of slots, a plurality of internal card readers positioned at each of the plurality of slots, a transceiver connected to each of the plurality of internal card readers and an antenna for communicating with external devices (e.g., external card readers separate from the cardholder sleeve), and a user interface that allows a user to select a respective card held in a respective slot of the plurality of slots. For example, the user interface may select the respective card in response to receiving user input by coupling the transceiver to a respective card reader positioned at the respective slot holding the respective card (e.g., to complete a circuit between the respective card reader and the transceiver). The transceiver may be configured to, in response to receiving interrogating signals from an external card reader (separate from the cardholder sleeve), activate the respective internal card reader to read information from the integrated circuit chip of the respective card and transmit (i.e., repeat) the read information to the external card reader. By embedding shielding material in each of the plurality of slots and including internal card readers in each of the slots and at least one transceiver, the cardholder sleeve may reduce or eliminate the ability of a malicious third party to steal the data from the cards held in the cardholder sleeve for purposes of a future fraudulent transaction while allowing a user to use a card without having to remove the card from the cardholder sleeve.

In some examples, one or more internal card readers with the cardholder sleeve may comprise internal contact card readers configured to come in contact with the pattern of metal contacts on the contact card to electronically couple the card reader to the integrated circuit (IC) embedded in the contact card. When the respective slot holding the contact card is selected via the user interface, the internal contact card reader may read information from the contact card in response to the transceiver of the cardholder sleeve receiving interrogating signals from an external card reader and the transceiver may transmit (i.e., repeat) the information read from the IC chip of the selected contact card. In this way, the cardholder sleeve essentially enables the contact card to be used as a contactless card without having to remove the contact card from the sleeve. This may be particularly beneficial to persons with disabilities whom may otherwise be unable to physically insert a contact card into an external card reader.

According to the disclosed techniques, the cardholder sleeve may enhance or limit the communication range of the cards held within the cardholder sleeve. For example, the transceiver and/or an antenna coupled to the transceiver may be configured to have a longer wireless communication range than the range of a typical contactless card. In some examples, the cardholder sleeve may include a battery to power the longer-range transceiver and/or antenna within the cardholder sleeve to enable longer range communications with external card readers. In some examples, the battery may be wrapped around the cardholder sleeve and/or around one or more slots and serve as the antenna for the transceiver. In some examples, the battery may be rechargeable and/or be solar powered. This can be particularly beneficial to persons with disabilities whom may otherwise be unable to orient a contactless card within a certain proximity of (or tap the card on) an external card reader or physically insert a contact card into an external card reader.

In other examples, instead of having a single transceiver that is selectively connected to each internal card reader, each slot of the cardholder sleeve may include a dedicated transceiver and antenna directly connected to internal card reader for the slot. These transceivers and/or antennas may be configured to have different communication ranges. For example, certain slots of the cardholder sleeve may include antenna with shorter communication ranges than other slot antennas with longer communication ranges at other slots of the cardholder sleeve (e.g., certain lots may include short-range antennas while other slots may include long-range antennas). In this way, a cardholder may insert financial cards (e.g., credit cards, debit cards) or other high-risk cards (e.g., cards containing sensitive data) in slots having transceivers and/or antennas with shorter communication ranges and access cards (e.g., parking garage access card) or other low-risk cards (e.g., card containing less sensitive data) in slots having transceivers and/or antennas with longer communication ranges. The cardholder may thus selectively enhance security against skimming for some cards (e.g., high-risk cards) while enhancing convenience or utility for other cards (e.g., low-risk cards).

In some examples, the cardholder sleeve may not include any transceivers. Instead, the shielding material may be configured to become electronically transparent when selected (or deactivated) by a user via the user interface. For example, this shielding material may allow a cardholder to turn on or off the electronic opaqueness of the shielding material around a particular card or slot and allow direct communication between an external card reader and a contactless card held within a deactivated slot. In other words, the shielding material would allow the contactless card to directly receive interrogating signals from the external card reader and to directly transmit data to that external card reader. In another example, shielding material over an IC chip may comprise the user interface that enables communication between the IC chip and an external card reader. For example, the user interface may comprise slidable shielding material that can be moved (e.g., slid) on or off of the IC chip of a contactless card. In this way, a cardholder may enable communications between the IC of a contactless card and an external card reader by sliding the shielding material off of the IC chip of the card.

FIG. 1 is a block diagram illustrating a system 101 that includes an example cardholder sleeve 114 with selectable wireless communication capabilities for communicating with an external card reader 130. Cardholder sleeve 114 is configured to hold two or more cards in two or more slots 115A-115C (collectively, "slots 115"). Cardholder sleeve 114 may comprise a booklet with a plurality of sheets having pockets that correspond to the plurality of slots, as shown in FIG. 1. For example, FIG. 1 shows card 100 held within slot 115A of cardholder sleeve 114. System 101 further includes an external card reader 130 and a server 138 configured to communicate with external card reader 130 over network 140 (e.g., the Internet). In some examples, server 138 is associated with third party system 142 that may be a financial institution (e.g., a bank), non-bank card-issuer, a merchant, a transit authority, a business, etc.

Figure 2A:
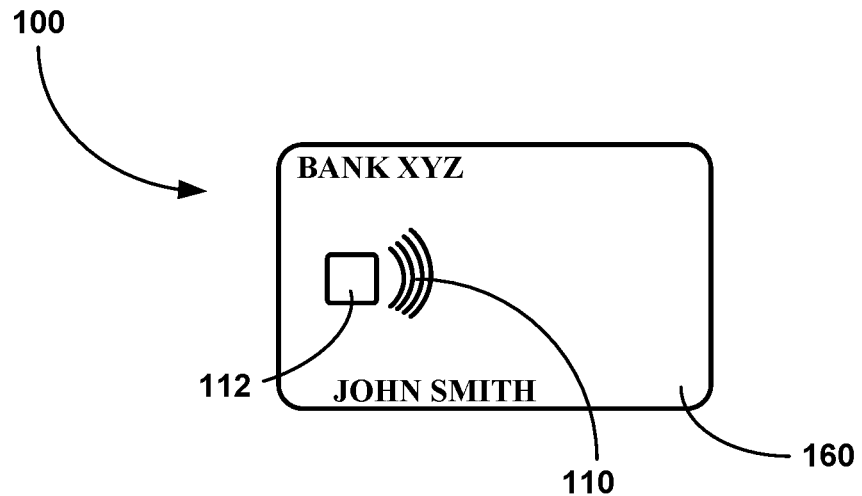
FIG. 2A is a conceptual diagram illustrating a contactless card in accordance with the techniques of this disclosure.

Card 100 may be a credit card, debit card, access card, or some other type of card (e.g., a driver's license or student ID, a work badge, a parking card, or a hotel key card) that stores data (e.g., financial information, account information, identification information, access information) on one or more integrated circuits (ICs) 112. Though card 100 is depicted in FIG. 1 as having a single IC 112 for purposes of illustration, in other examples card 100 may have two or more ICs 112. IC 112 may include a memory to store the data. IC 112 may further include other circuitry components understood by one of ordinary skill in the art to be used to execute functions (e.g., authentication functions, encryption functions) for participating in transactions with a card reader. In some examples, card 100 may be a contact card that may be configured to be readable by a conventional chip reader (e.g., as a result of inserting card 100 into the chip reader). In some examples, IC 112 may include short-range antennas (e.g., as shown in FIG. 2A) for communicating with a card reader wirelessly (e.g., using NFC communications). Card 100 may further include a magnetic strip (not shown) readable by swiping or dipping the card into a magnetic card reader.

Each of slots 115 of cardholder sleeve 114 may be surrounded by or comprise shielding material to shield the communication features of card 100 to reduce or prevent skimming and/or interference with other cards in sleeve 114. For example, the shielding material can surround card 100 (e.g., cover the front, back, top, and/or sides of card 100).

This shielding material may comprise metallic material (e.g., aluminum, tin, copper, nickel) or any other type of material or fabric that can shield or block electromagnetic radio-frequency (RF), NFC, or other wireless signals (e.g., interrogating signals from an external card reader). According to examples of this disclosure, cardholder sleeve 114 includes one or more internal card readers 116 inside each slot 115 of cardholder sleeve 114 to read information from the card held within each slot 115. Cardholder sleeve 114 further includes a user interface 118 that enables a user to select a card for use (e.g., to activate one or more internal card readers 116 corresponding to the selected one or more cards), and a transceiver 120 that operates as a repeater to transmit information read by a selected internal card reader 116 from the IC 112 of the selected card 100. For example, a user may select card 100 to active internal card reader 116 to read information from card 100 in response to receiving interrogating signals from external card reader 130. In this way, card 100 may be used to perform a contactless transaction with external card reader 130 without having to take the card out of cardholder sleeve 114.

In operation, a user or cardholder may enter user input at user interface 118 of cardholder sleeve 114 to select a card (e.g., card 100) held in a respective slot of slots 115 of the cardholder sleeve (e.g., slot 115A) and electronically couple the respective internal card reader 116 corresponding to the selected card 100 to transceiver 120. In this way, any interrogating signals received by transceiver 120 will be transmitted to the selected card reader 116 to power the IC of the corresponding card (e.g., IC 112 of card 100). The user interface 120 may comprise a switch, a button configured to toggle between internal card readers or configured to select an internal card reader, or any other user interface element that may allow a user to select an internal card reader based on the placement of a desired card in cardholder sleeve 114.

External card reader 130 may be a device that processes transactions for a merchant, such as a point-of-sale (POS) device, or performs access determinations, such as a turnstile at a metro stop, a gate at a parking garage, a lock on a door. To process transaction or perform access determinations, external card reader 130 may transmit or broadcast interrogating signals requesting card information. For example, antenna 134 of external card reader 130 may transmit interrogating signals requesting card information. In some examples, external card reader 130 may be pseudo-continuously sending or broadcasting interrogating signals (e.g., in the case of a transit turnstile or secure access point). In certain examples, external card reader 130 only sends the interrogating signals when manually instructed to (e.g., as a result of a cashier operating external card reader 130). Transceiver 120 may receive interrogating signals from the external card reader 130 when transceiver 120 is within operational range of antenna 134. In some examples, the interrogating signals, similar to other signals discussed herein, may be an RF signal.

In response to receiving the interrogating signals from external card reader 130, transceiver 120 may activate the selected internal card reader to read information from the respective card held in the slot corresponding to the electronically coupled internal card reader. For example, if card 100 is or was selected (e.g., selected before, during, or after the interrogating signals were received) for use by a user, transceiver 120 will activate internal card reader 116 to read information from IC 112 of card 100. In this example, because internal card reader 116 is electronically coupled to transceiver 120, the interrogating signals will power IC 112 of card 100 and enable the internal card reader 116 to read information from the IC 112 of card 100 (e.g., through the pattern of metal contacts or NFC communications with the IC 112). In some examples, the read information may include information such as account number, employee ID, a name, phone number, email address, rewards program number, or any other information that can be stored in IC 112. Either way, transceiver 120 will then transmit (i.e., repeat) the information read from IC 112 of card 100 to external card reader 130. In some examples, if no internal card reader is selected, no internal card reader will be activated, no information will be read from any card, and no information will be transmitted. Reading and transmitting card information only when one of the internal card readers is selected may reduce or eliminate the ability of malicious parties to execute fraudulent transactions using data gathered by card skimming.

In response to receiving the information from transceiver 120 at antenna 134, controller 132 of external card reader 130 may determine access rights or complete a transaction based the received information. For example, card 100 may be a transit card and external card reader 130 and/or server 138 may determine whether a user has access rights or sufficient funds to access a transit stop or board a transit vehicle (e.g., bus, train, subway) based on the information read from card 100. In some examples, controller 132 of external card reader will extract the necessary funds from the transit card balance (or instruct server 138 to extract the funds) before granted access (e.g., unlocking a turnstile) to the transit stop or vehicle. In another example, card 100 may be an employee badge and controller 132 of external card reader 130 and/or server may determine whether a user has access rights to a facility, a floor, a room, or any area that received particular access rights based on the information read from card 100.

For example, external card reader 130 may be a terminal that is used to gain entry to a secure building or area and the information read from card 100 may comprise identifying information that would enable the entrance station to unlock or open a respective door to a secure building or area. In another example, external card reader 130 may be an entrance station of a parking garage located at an entrance and exit to the parking garage and the information read from card 100 may comprise identifying information that would enable the entrance station to raise a railing to provide the cardholder access to the parking garage. The identifying information read from card 100 may comprise a name, date of birth, username, employee number, or the like that is related to the cardholder. In some examples, external card reader 130 may communicate the received information to server 138 via network 140 and server 138 may determine whether the cardholder has proper access rights. In some examples, the secure building or area is associated with (e.g., owned or operated by) third party system 142.

In some examples, this identifying information may be encrypted and external card reader 130 may send the encrypted information to server 138 to decrypt the identifying information. Server 138 may then determine whether the cardholder has process access rights. Alternatively, server 138 may transmit the decrypted identifying information to external card reader 130 and controller 132 may use it to identify the cardholder and determine whether the cardholder has proper access rights.

In some examples, card 100 may be a financial card (e.g., a debit card or a credit card) and external card reader may complete a financial transaction using the received information. When the card 100 is a financial card, the information read from that card and transmitted to external card reader 130 may include financial data to process the transaction (e.g., an account number, pin number, password, one-time passcode, or the like for a checking account used by a cardholder of card 100). In some examples, external card reader 130 may work with other entities such as third party system 142 (e.g., a payment processing entity, a credit card network, the financial institution that issued card 100) to process the transaction. For example, server 138 may be a financial institution sever corresponding to third party system 142 (e.g., a financial institution) and external card reader 130 may communicate the received information to server 138 via network 140 to complete the transaction on behalf of third party system 142.

In some examples, external card reader 130 may be configured to accept an input from the cardholder via one or more input devices (not shown) (e.g., touchscreen, keypad, keyboard). For example, the input may comprise a PIN number, a password, a confirmation, an acceptance of one or more rates or options for a transaction, or any other input. In response to receiving the input from the cardholder, external card reader 130 may use the input to process the transaction or to determine access rights.

In some examples, controller 132 of external card reader 130 may be a software module configured to execute functions attributed to external card reader 130 discussed herein and antenna 134 may be a three-dimensional coil or printed trace or the like that is configured to send and receive electromagnetic or other wireless signals as discussed herein. External card reader 130 may include a processor and a memory (not shown), where the memory stores instructions relating to the functions attributed to external card reader 130 (e.g., such that the memory stores controller 132) and the processor executes the functions (e.g., executes the actions of controller 132). In some examples, external card reader 130 may include a display or other output devices (not shown).

In some examples, both controller 132 and antenna 134 may be within a single housing of external card reader 130, whereas in other examples antenna 134 may be in one or more physically separate housings that are physically or wirelessly connected to external card reader 130 to communicate with controller 132. External card reader 130 may include a cluster of one or more computers, workstations, servers, and the like. For example, a first server may host controller 132 while a separate computer includes antenna 134 and other components that are necessary to execute transactions at a storefront of the merchant or to grant access to an area that requires particular access rights.

In some examples, network 140 may comprise a private network including, for example, a private network associated with third party system 142 (e.g., a financial institution, a merchant, or another business organization or enterprise). Alternatively, network 140 may comprise a public network, such as the Internet. Although illustrated in FIG. 1 as a single entity, in other examples network 140 may comprise a combination of public and/or private networks.

Similar to external card reader 130, server 138 may include a cluster of one or more computers, workstations, servers, and the like. Server 138 may that include at least one memory and one processor, wherein the memory stores information and instructions that relate to the functions attributed to third party system 142 (e.g., authentication or verification functions performed on behalf of third party system 142) while the processor is configured to execute these functions. In some examples, external card reader 130 directly interacts with server 138 through network 140 to authenticate card 100 or transactions using information read from card 100. Server 138 may also be configured to gather financial data (e.g., account balance, transaction limits), security data (e.g., warnings about new malicious activity relevant to the cardholder), or the like from a repository managed by third party system 142 (e.g., the financial institution associated with card 100).

In some examples, external card reader 130 may be a POS device that does not have internet connectivity, but rather is connected to a local area network (e.g., network 140) which includes server 138. In this example, external card reader 130 may substantially only have access to external data (e.g., new product data, financial data, authentication data, security data, personalization data, or the like) as a result of receiving said data from server 138. For purposes of clarity, external card reader 130 and server 138 are referenced and discussed herein as separate components, but it is to be understood that server 138 and external card reader 130 may be a single computer, or external card reader 130 and server 138 may be part of a single cluster of one or more computers. For example, external card reader 130 may be a POS device that both sends signals to and receives signals from cardholder sleeve 114 as described herein, as well as executing the functions of server 138 by communicating with other internal and external computing devices within system 101 to authenticate card 100 as described herein.

FIG. 2A depicts a contactless card 100 in accordance with the techniques of this disclosure. Card 100 may include one or more ICs 112 and one or more antennas 110, and may correspond to card 100 of FIG. 1. It is to be understood that antennas 110 are depicted using signal lines on front major surface 160 of card 100 for purposes of illustration only, and that antennas 110 may comprise any shape and size configured to function as described herein. For example, one or more antennas 110 may be incorporated into one or more of IC chips 112 or incorporated into the material of card 100. One or more antennas 110 may be short-range or long-range antennas that can perform NFC communications with a card reader when the one or more antennas 110 are in proximity to or tapped on a card reader and/or properly orientated near the card reader. In some examples, antennas 110 may be radio frequency (RF) antennas, such that card 100 is an NFC card or a radio frequency identification (RFID) card. Card 100 may not include a battery or other power source for IC 112 or antennas 110. Instead, card 100 may be powered by electromagnetic fields created by interrogating signals that are received by one or more antennas 110. When powered by the received interrogating signals, IC 112 may send reply signals containing certain information of the memory of IC 112 using the one or more antennas 110 in order for a card reader to execute a transaction, as described above with reference to FIG. 1.

Card 100 may be a credit card, debit card, access card, or any other type of card (e.g., a driver's license or student ID, a work badge, a parking card, or a hotel key card) that stores data (e.g., financial information, account information, identification information, access information) on one or more ICs 112. The data stored on the one or more ICs 112 may include information related to a cardholder of card 100 (e.g., identifying information), such as a name, username, telephone number, email address, identification number (e.g., driver's license number, student identification number, work identification number, employee number), or the like. The stored information may include unique financial information about the cardholder, such as an account number, routing number, passcode, PIN, password, account balance, or the like that identifies a financial account of the cardholder at a financial institution (e.g., the financial institution that issues card 100). The major surface of card 100 (e.g., surface 160) may be made of any material, such as polymer (e.g., polyvinyl chloride acetate), carbon fiber, or some combination of these or other materials. Though card 100 is depicted with one IC 112 for purposes of illustration, in other examples card 100 may have two or more ICs 112. IC 112 may include a memory to store the data. IC 112 may further include other circuitry components understood by one of ordinary skill in the art to be used to execute functions (e.g., authentication functions, encryption functions) for participating in transactions with a card reader. In some examples, card 100 may further include a magnetic strip for swiping (e.g., on the side opposite major side 160).

Figure 2B:
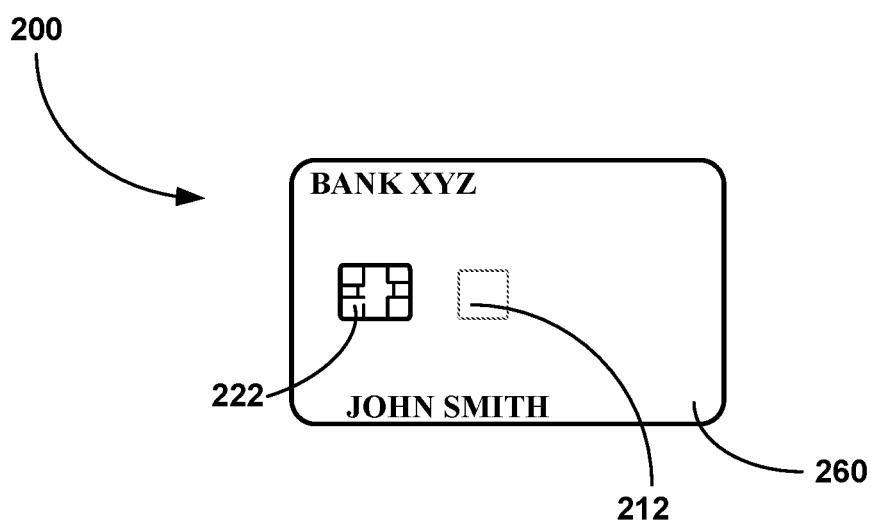
FIG. 2B is a conceptual diagram illustrating a contact card in accordance with the techniques of this disclosure.

FIG. 2B depicts a contact card 200 in accordance with the techniques of this disclosure. Card 200 may include one or more ICs 212 and one or more contact pads 222, and may correspond to card 100 of FIG. 1. It is to be understood that contact pads 222 are depicted separate from ICs 212 for purposes of illustration only, and that contact pads 222 and ICs 212 may be combined into one IC chip and configured to function as described herein. For example, one or more contact pads 222 may be incorporated into one or more of IC chips 212 such that the one or more IC chips 212 includes the one or more contact pads 222. In some examples, the one or more contact pads 222 are a pattern of metal contacts to electronically connect (e.g., couple) a card reader to the one or more IC chips 212 when contact card 200 is physically inserted or dipped into the card reader. IC 212 of card 200 may be powered by a card reader when inserted or dipped into the card reader to read information off of the memory of IC 212.

Like card 100, card 200 may be a credit card, debit card, access card, or any other type of card (e.g., a driver's license or student ID, a work badge, a parking card, or a hotel key card) that stores data (e.g., financial information, account information, identification information, access information) on one or more ICs 212. The data stored on the one or more ICs 212 may include any of the information stored on IC 112 of card 100. The major surface of card 200 (e.g., surface 260) may be made of any material, such as polymer (e.g., polyvinyl chloride acetate), carbon fiber, or some combination of these or other materials. Though card 200 is depicted with one IC 212 for purposes of illustration, in other examples card 200 may have two or more ICs 212. IC 212 may further include a memory to store the data or any other circuitry components understood by one of ordinary skill in the art to be used to execute functions (e.g., authentication functions, encryption functions) for participating in transactions with a card reader.

Figure 3:
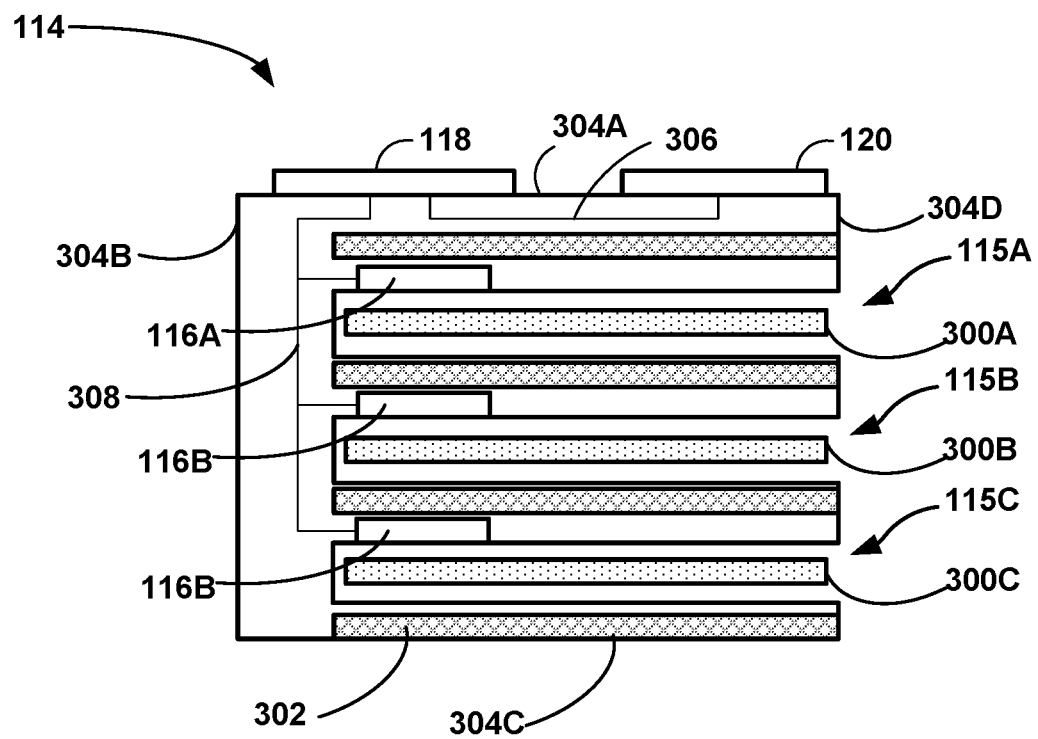
FIG. 3 is a conceptual and schematic diagram illustrating a cardholder sleeve in accordance with the techniques of this disclosure.

FIG. 3 is a conceptual and schematic diagram illustrating a cardholder sleeve 114 in accordance with the techniques of this disclosure. In this example, cardholder sleeve includes slots 115A, 115B, and 115C (collectively, "slots 115") to hold cards 300A, 300B, and 300C (collectively, "cards 300"), respectively. Each of cards 300 may correspond to card 100 or 200. While three slots (e.g., 115A, 115B, and 115C) are shown in FIG. 3, it is understood that a cardholder sleeve may include fewer or more slots 115 in accordance with techniques of this disclosure. Further, while FIG. 3 illustrates open slots 115 on side 304D of cardholder sleeve 114, it is understood that cards 300 may be enclosed on side 304A of cardholder sleeve 114 as well. For example, cardholder sleeve 114 may comprise a booklet with a plurality of sheets having pockets corresponding to the plurality of slots, as shown in FIG. 1. Cardholder sleeve 114 may comprise soft material (e.g., leather, cloth, polyester, soft plastic, metallic fabric), rigid material (e.g., hard plastic, copper, nickel, aluminum, tin) or a combination of soft and rigid material. For example, the exterior portions of cardholder sleeve 114 may comprise a rigid material (e.g., the portions around sides 304A-304D of cardholder sleeve) and the materials comprising the slots 115 may be soft.

Cardholder sleeve 114 may further include internal card readers 116A, 116B, and 116C (e.g., collectively, "internal card readers 116") positioned adjacent to slot 115A, to slot 115B, and to slot 115C, respectively. Each of internal card readers 116 may be configured to read information from one or more IC chips within each of cards 300 (e.g., IC chip 112 of FIGS. 1 and 2A, IC chip 212 of FIG. 2B). In some examples, internal card readers 116 may positioned such that they come in contact with the IC chips of cards 300. In other examples, internal card readers 116 may be positioned such that they do not come in contact with the IC chips of cards 300 (e.g., allow air or material to be in between each of internal card readers 116 and each of cards 300). In some examples, one or more internal card readers 116 may comprise contactless card readers (e.g., may communicate with the IC of cards 300 through NFC communications) and one or more internal card readers 116 may comprise contact card readers. For example, one or more internal card readers may be configured to contact patterns of metal contacts on a card (e.g., contact pads 222 of card 200) to read information of that card.

Cardholder sleeve 114 may include shielding material 302 to surround each of slots 115. As depicted, shielding material 302 may extend over and/or beyond the entire major surfaces of the cards 300. In some examples, shielding material may extend over and or beyond the areas over the IC chips of cards 300 but not completely extend over the major surfaces of cards 300. While FIG. 3 shows shielding material 302 embedded adjacent to each major surface of cards 300, it is understood that shielding material 302 may completely surround each of cards 300 on all sides (e.g., shielding material can be embedded on sides 304A, 304B, 304C, and 304D of cardholder sleeve 114). In some examples, shielding material 302 may be embedded on sides 304A, 304B, 304C, and 304D of cardholder sleeve 114 or only on a first major side of each of slots 115. For example, shielding material 302 may be embedded on the side of each of slots 115 that is opposite the side that includes an internal card reader 116 and no shielding material 302 may be embedded on the side of each of slots 115 that includes the internal card reader (or vice versa). In this way, a user can turn to a desired card and tap on the side of the slot without shielding material to use the card at an external card reader or POS device (e.g., external card reader 130 of FIG. 1). Shielding material 302 may comprise metallic material (e.g., aluminum, tin, copper, nickel) or any other type of material or fabric that can shield or block electromagnetic RF, NFC, or other wireless signals (e.g., interrogating signals from an external card reader). In some examples, cardholder sleeve 114 may be composed of shielding material 302.

Cardholder sleeve 114 may further include user interface 118 that enables a user or cardholder to select one of cards 300 for use (e.g., to activate one of internal card readers 116 corresponding to the selected card), and transceiver 120 that operates as a repeater to transmit information read by a selected internal card reader 116 from the selected one of cards 300. User interface 118 and transceiver may be electronically coupled via connector 306 (e.g., conductive traces, wires, cables) and user interface may be electronically coupled to each of internal card readers 116 via connectors 308 (e.g., conductive traces, wires, cables). While FIG. 3 shows connectors 308 converging into a single connector that leads to user interface 118, it is understood that each of connectors 308 coupled to each of internal card reader 116A, 116B, and 116C may remain electronically isolated leading into user interface 118 such that a user may activate one or more individual card readers 116 to read information from one of cards 300 at time. For example, a user may select the slot 115A in which card 300A is inserted to activate internal card reader 116A to read information from card 300A in response to receiving interrogating signals from an external card reader or POS device (e.g., external card reader 130 of FIG. 1). In this way, card 300A may be used without having to take card 300A out of cardholder sleeve 114.

Figure 4:
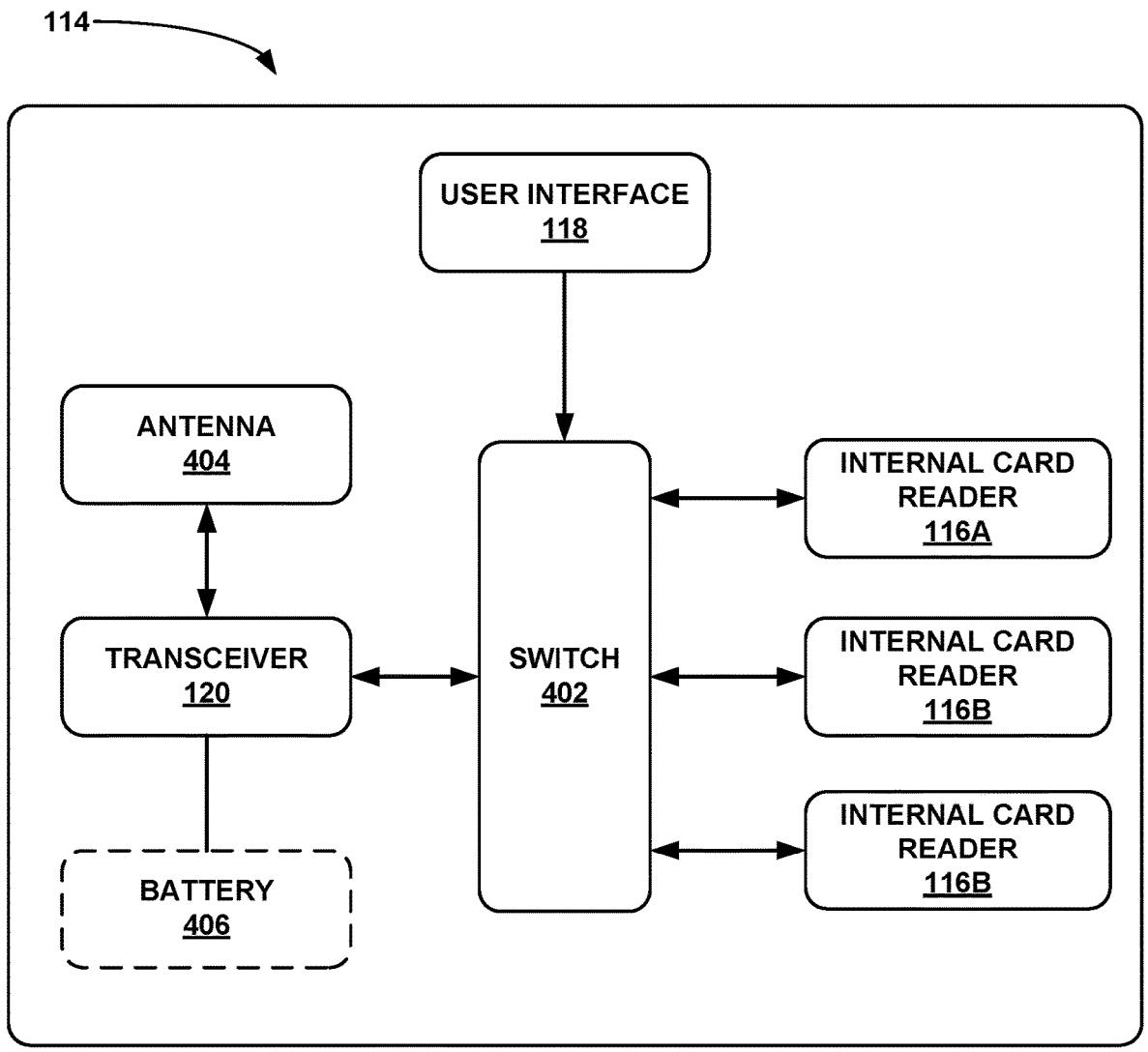
FIG. 4 is a block diagram illustrating a cardholder sleeve in accordance with the techniques of this disclosure.

In operation, a user or cardholder may enter user input at user interface 118 of cardholder sleeve 114 to select card 300A held in slot 115A of the cardholder sleeve 114, which may electronically couple internal card reader 116A to transceiver 120 (e.g., within user interface 118 and/or via a switch as shown in FIG. 4). In this way, any interrogating signals received by transceiver 120 will be coupled to selected internal card reader 116A and activate internal card reader 116A to read information from the IC chip of card 300A, without activating any other internal card reader. In this example, because internal card reader 116A is electronically coupled to transceiver 120 via user interface 118, the interrogating signals will power the IC chip of card 300A and enable the internal card reader 116 to read information from the IC chip of card 300A (e.g., through the pattern of metal contacts on card 300A or NFC communications with the IC chip of card 300A). In some examples, a user or cardholder may select a card 300 before, during, or after interrogating signals are received by transceiver 120. User interface 118 may comprise a switch, a button configured to toggle between internal card readers 116 or configured to select one of internal card readers 116, or any other user interface element that may allow a user to select one of internal car readers 116. After internal card reader 116 reads information from card 300A, transceiver 120 will then transmit (e.g., repeat) the information read from card 300A to an external card reader or POS device (e.g., external card reader 130 of FIG. 1). In some examples, if no internal card reader is selected, no internal card reader will be activated, no information will be read from any card, and no information will be transmitted. In other words, selecting one of cards 300 closes a circuit between the respective internal card reader and the transceiver to enable the respective card reader to read the selected card. Reading and transmitting card information only when one or more internal card readers 116 are selected may reduce or eliminate the ability of malicious parties to execute fraudulent transactions using data gathered by card skimming.

FIG. 4 is a block diagram of cardholder sleeve 114 of FIG. 1 in accordance with the techniques of this disclosure. Cardholder sleeve 114 includes user interface 118, transceiver 120, antenna 404, switch 402, and internal card readers 116A, 116B, and 116C (collectively, "internal card readers 116"). As shown in FIG. 4, cardholder sleeve 114 may optionally include battery 406 to power transceiver 120 and/or antenna 404 to enable longer range communications with external card readers. The components of cardholder sleeve 114 are coupled (e.g., physically, communicatively, and/or operatively) via connectors (e.g., conductive traces, wires, cables). In some examples, cardholder sleeve 114 may include more or less components. For example, cardholder sleeve 114 may include fewer or more internal card readers 116 and/or more transceivers 120 than shown in FIG. 4. In another example, cardholder sleeve 114 may couple battery 406 or additional batteries to other components (e.g., user interface 118, internal card readers 116).

User interface 118 may comprise any means for a user to select one of internal card readers 116. For example, user interface 118 may be a button configured to toggle between each of internal card readers 116. In another example, user interface 118 may comprise a plurality of buttons, with each button corresponding to a different internal card reader. In some examples, only the internal card reader corresponding to the last button to receive user input will be selected/activated. In some examples, user interface 118 may be a sliding mechanism that allows a user to select internal card reader 116A, 116B, or 116B. User interface 118 may also be a mechanical switch.

Each of internal card readers 116 may be positioned in a slot of cardholder sleeve 114 configured to hold a card (e.g., slots 116, cards 100 in FIGS. 1 and 2A, card 200 in FIG. 2B, cards 300 in FIG. 3) and may be configured to read information from the card held within the respective slot. In some examples, internal card readers 116 may positioned such that they come in contact with IC chips (IC chips 112 of FIGS. 1 and 2A, IC chips 212 of FIG. 2B) of the cards within the respective slots. For example, one or more internal card readers 116 may comprise contact card readers that are configured to contact the patterns of metal contacts (e.g., contact pads 222 of FIG. 2B) on a card to read information of the IC of that card. In some examples, internal card readers 116 may be positioned such that they do not come in contact with the IC chips of the cards within the respective cards (e.g., internal card readers are positioned such that air or material may be in between each of internal card readers 116 and the respective card and/or the IC chip of the card in the respective slot). For example, one or more internal card readers 116 may comprise contactless card readers configured to communicate with the IC chips of cards held within the respective slots through NFC communications or any other wireless communication methods. In some examples, internal card readers 116 may comprise a combination of contact card readers and contactless card readers.

Switch 402 may receive user input from user interface 118 and couple one of internal card readers 116 to transceiver. For example, a user may select internal card reader 116A at user interface 118, and switch 402, in response to receiving the user input from user interface 118, may electronically couple internal card reader 116A to transceiver 120 to complete a circuit between internal card reader 116A and transceiver 120 (e.g., without coupling another internal card reader 116 to transceiver 112) as described herein. In this way, when interrogating signals from an external card reader or POS device (e.g., external card reader 130 of FIG. 1) are received at transceiver 120 via antenna 404, the interrogating signals will power and activate internal card reader 116A to read information from the IC chip embedded in the respective slot in which internal card reader 116A is positioned. Conversely, the information read by internal card reader 116A will reach transceiver 120, due to the electronic coupling by switch 402, and transceiver will transmit (e.g., repeat) the read information to the external card reader via antenna 404. In some examples, battery 406 is coupled to transceiver 120 and/or antenna 404 (e.g., as shown in FIG. 4) to enable a longer wireless communication range between cardholder sleeve 114 and an external card reader than the range between a typical contactless card and external card reader. In some examples, battery 406 may be wrapped around cardholder sleeve 114 and/or around one or more slots and serve as the antenna for the transceiver. In some examples, battery 406 may be rechargeable and/or be solar powered.

In some examples, if one of internal card reader 116 is not selected via user input at user interface 118, switch 402 will not couple any of internal card readers 116 to transceiver 120. Thus, no internal card reader 116 will be activated and no information being read from any card in response to transceiver 120 receiving interrogating signals. In some examples, transceiver 120 may not receive interrogating signals when no internal card reader 116 is selected via user input at user interface 118. By reading and transmitting card information only when an internal card reader is selected, fraudulent transactions using data gathered by card skimming and/or inadvertent transactions (e.g., double payments) may be reduced.

Figure 5:
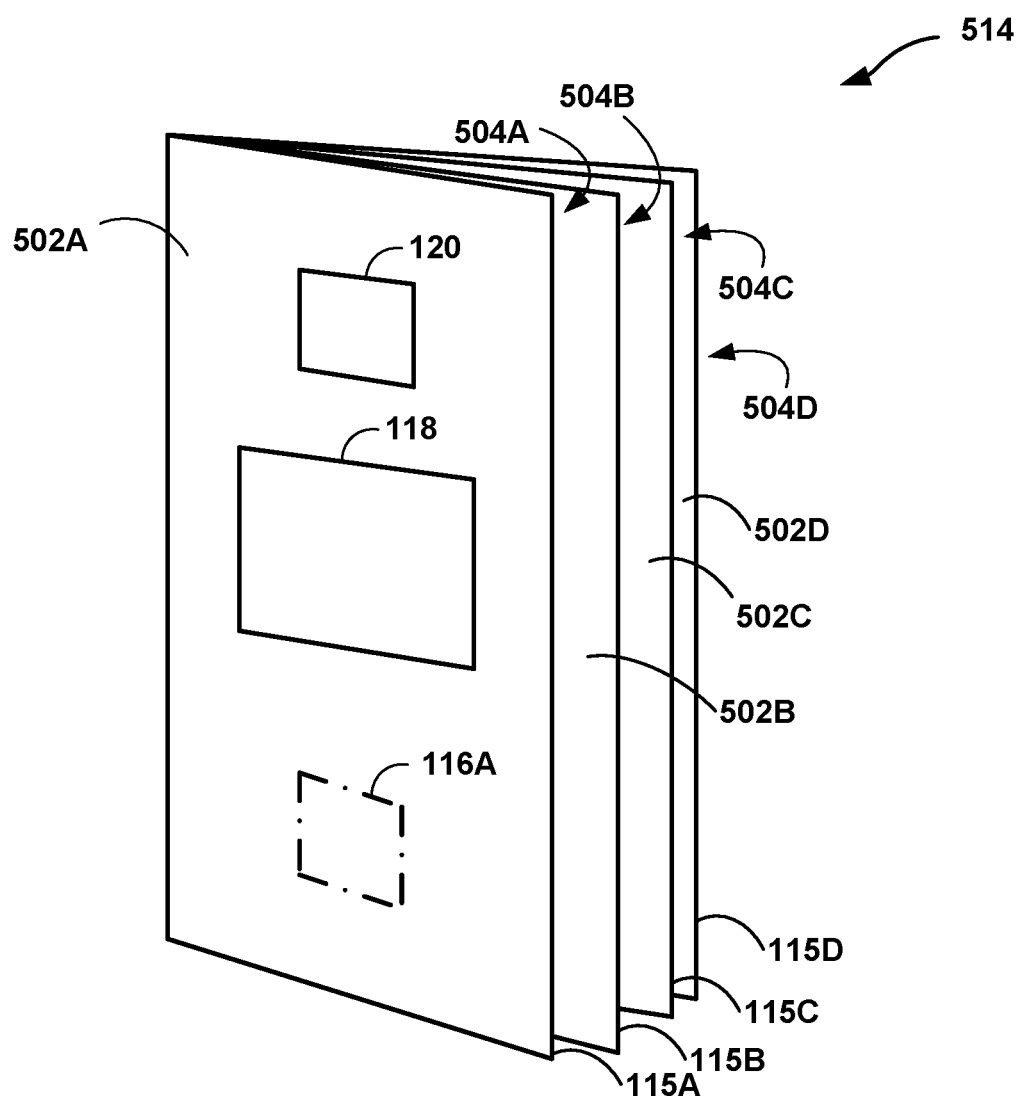
FIG. 5 is a conceptual diagram illustrating another example cardholder sleeve in accordance with the techniques of this disclosure.

FIG. 5 is a conceptual diagram illustrating another an example cardholder sleeve 514 in accordance with the techniques of this disclosure. Example cardholder sleeve 514 may correspond to the cardholder sleeve 114 shown in FIGS. 1, 3, and 4. Cardholder sleeve 514 may be configured to hold cards within slots 115A, 115B, 115C, and/or 115D (collectively, "slots 115"). Cardholder sleeve 514 may comprise a booklet with a plurality of sheets having pockets corresponding to the plurality of slots, as shown in FIG. 5. While FIG. 5 shows four slots (e.g., 115A, 115B, 115C, and 115D), it is understood that a cardholder sleeve may include fewer or more slots 115 in accordance with techniques of this disclosure. Each of slots 115 of cardholder sleeve 514 may be surrounded by or comprise shielding material to shield the communication features of one or more cards held within slots 115 to reduce or prevent skimming and/or interference between cards held in cardholder sleeve 514 (e.g., as described above with reference to FIGS. 1 and 3). Cardholder sleeve 514 may comprise soft material (e.g., leather, cloth, polyester, soft plastic, metallic fabric), rigid material (e.g., hard plastic, copper, nickel, aluminum, tin) or a combination of soft and rigid material. For example, major surfaces 502A/504D may comprise a rigid material and the remaining materials comprising the slots 115B and 115C may be soft.

Each of slots 115 may include one or more internal card readers configured to read information from the card held within the respect slot. For example, slot 115A may include internal card reader 116A, slot 115B may include internal card reader 116B (not shown), slot 115C may include internal card reader 116C (not shown), and slot 115D may include internal card reader 116D (not shown). Each of card readers 116 may comprise a contact card reader or a contactless card reader (e.g., as described above with reference to FIGS. 1 and 3-4). Cardholder sleeve 514 may include user interface 118 configured to enable a user or card holder to select one of internal card readers 116 (e.g., select the internal card reader corresponding to a card held within slots 115). By selecting one of internal card readers 116 via user input received at user interface 118, cardholder sleeve 514 may couple the selected one or more internal card reader 116 with the transceiver 120 (e.g., as described above with reference to FIGS. 1, 3, and 4). As described above, transceiver 120 may be configured to receive interrogating signals from an external card reader or POS device (e.g., external card reader 130 of FIG. 1). In response to receiving one or more interrogating signals, transceiver 120 may be configured to activate (e.g., power) the selected one or more internal card readers 116 to read information from the respective cards and transmit (e.g., repeat) the read information to the external card reader or POS device. In this way, each of the cards held within cardholder sleeve 514 may be used without having to take out the respective card from the sleeve and, in some examples, essentially enables contact cards to be used as contactless cards.

In some examples, each of internal card readers 116 may be placed in position within each of slots 115 near where an IC chip of card is likely to be located (e.g., based on IC chip and/or card standards), including an area other than shown in FIG. 5. For example, internal card reader 116A may be positioned at a position near where transceiver 120 is shown in FIG. 5, and vice versa. Similarly, user interface 118 may positioned in any other position on major surface 502A of slot 115A. While FIG. 5 illustrates a single internal card reader positioned within one major surface of each slot (e.g., on any side corresponding to major surfaces 502A-502D), it is understood that some slots 115 may include more than one internal card reader 115 on one or more major surfaces. For example, any of slots 115 may include a second internal card reader near the position corresponding to transceiver 120 on major surface 504A shown in FIG. 5. Similarly, any of slots 115 may include additional internal card readers on opposite sides of the slots shown (e.g., on any of sides corresponding to major surfaces 504A-504D). For example, slot 115A may include one or more internal card reader embedded on the side corresponding to major surface 504A (opposite major surface 502A). By including multiple internal card readers per slot and/or per side of a slot, a user may insert a card into that slot in any orientation and have a card reader positioned at a location near the IC chip of that card. In other words, a card holder need not worry about how to orient a card when he or she inserts it into a slot because an internal chip reader may be included in any and/or all possible positions of where the IC chip of a card may be located.

Figure 6:
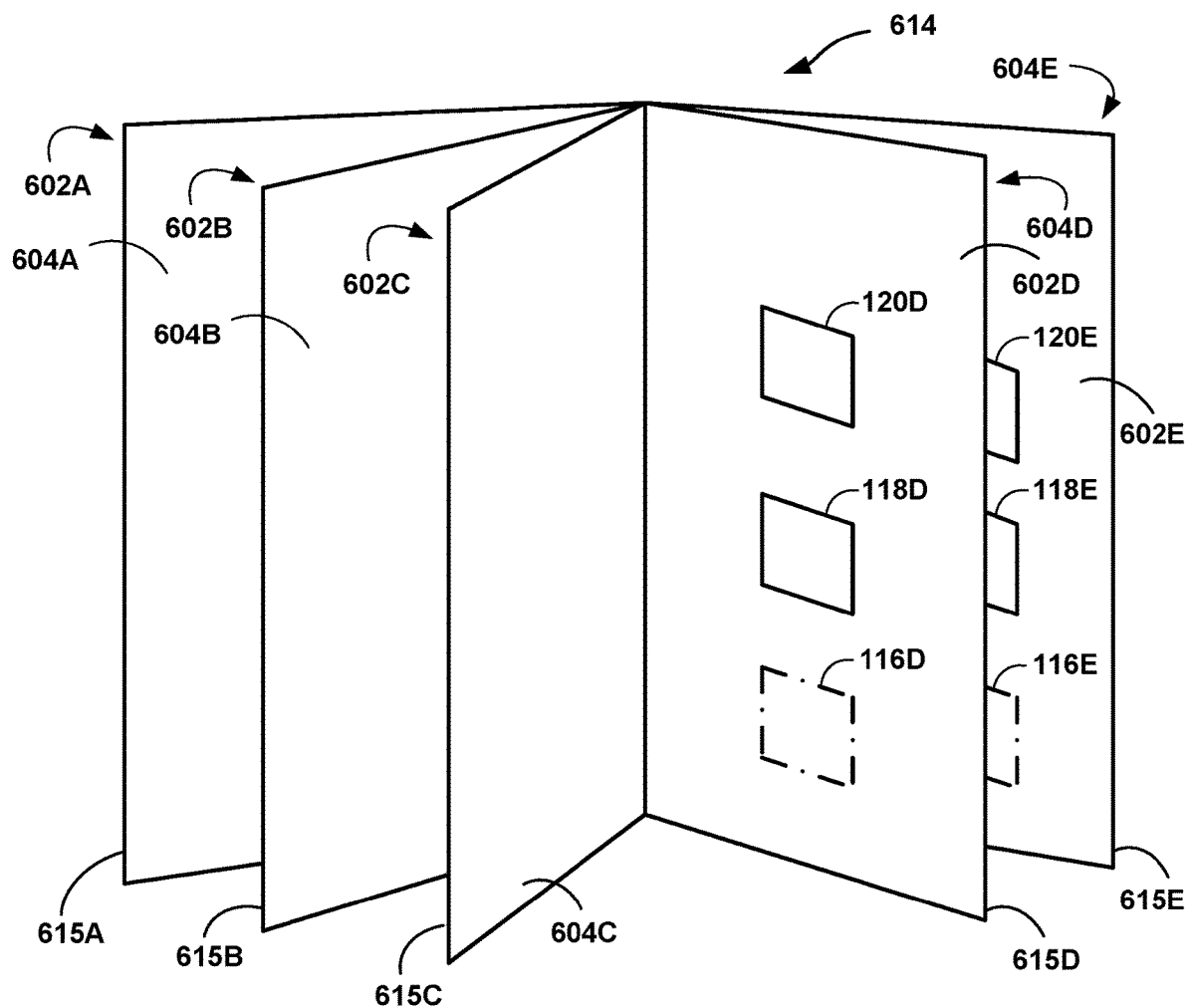
FIG. 6 is a conceptual diagram illustrating another example cardholder sleeve in accordance with the techniques of this disclosure.

FIG. 6 is a conceptual diagram illustrating another example cardholder sleeve 614 in accordance with the techniques of this disclosure. Cardholder sleeve 614 may be configured to hold cards within slots 615A, 615B, 615C, and/or 615D (collectively, "slots 615"). Cardholder sleeve 614 may comprise a booklet with a plurality of sheets having pockets corresponding to the plurality of slots, as shown in FIG. 6. While FIG. 6 shows four slots (e.g., 615A, 615B, 615C, and 615D), it is understood that a cardholder sleeve may include fewer or more slots 615 in accordance with techniques of this disclosure. Each of slots 615 of cardholder sleeve 614 may be surrounded by or comprise shielding material to shield the communication features of one or more cards held within slots 615 to reduce or prevent skimming and/or interference between cards held in cardholder sleeve 614 (e.g., as described above with reference to FIGS. 1, 3, and 5). Cardholder sleeve 614 may comprise soft material (e.g., leather, cloth, polyester, soft plastic, metallic fabric), rigid material (e.g., hard plastic, copper, nickel, aluminum, tin) or a combination of soft and rigid material. For example, major surfaces 602A, 604D and/or 604A/602D may comprise a rigid material and the remaining materials comprising the slots 615B and 615C may be soft.

Each of slots 615 may include one or more internal card readers 116 configured to read information from the card held within the respect slot (e.g., as described above with respect to FIG. 5). For example, slot 615A may include internal card reader 116A (not shown), slot 615B may include internal card reader 116B (not shown), slot 615C may include internal card reader 116C (not shown), slot 615D may include internal card reader 116D, and slot 615E may include internal card reader 116E. Each of card readers 116 may comprise a contact card reader or a contactless card reader (e.g., as described above with reference to FIGS. 1 and 3-5). Cardholder sleeve 614 may include a user interface 118A-118E on a major surface of every sleeve 615 of cardholder sleeve 614. For example, slot 615A may include user interface 118A on major surface 602A (not shown), slot 615B may include user interface 118B on major surface 602B (not shown), slot 615C may include user interface 118C on major surface 602C (not shown), slot 615D may include user interface 118D on major surface 602D, and slot 615E may include user interface 118E on major surface 602E. Each of user interface 118A-118E may be configured to enable a user or card holder to select or activate internal card readers 116A-116E, respectively, as described herein.

Cardholder sleeve 614 may further include a transceiver 120A-120E on a major surface of every sleeve 615 of cardholder sleeve 614. For example, slot 615A may include transceiver 120A on major surface 602A (not shown), slot 615B may include transceiver 120B on major surface 602B (not shown), slot 615C may include transceiver 120C on major surface 602C (not shown), slot 615D may include transceiver 120D on major surface 602D, and slot 615E may include transceiver 120E on major surface 602E. By including a transceiver and one or more internal card readers in every slot, a user may be able to turn cardholder sleeve to any slot and activate the desired internal card reader(s) corresponding to that slot (e.g., via the respective user interface). For example, a user or cardholder may turn cardholder sleeve to slot 615D and enter user input at user interface 118D to couple internal card reader 116D to transceiver 120D. By selecting internal card reader 116D via user input at user interface 118D, transceiver 120D may be configured to activate (e.g., power) the internal card reader 116D to read information from the respective card held in slot 615D and transmit (e.g., repeat) the read information to the external card reader or POS device, in response to transceiver 120D receiving one or more interrogating signals. In this way, each of the cards held within cardholder sleeve 614 may be used without having to take out the respective card from the sleeve.

In some examples, each of user interface 118 may comprise a button or switch configured to couple or uncouple the respective internal card reader 116 to the respective transceiver. In some examples, slots 615 may not include a transceiver 120. For example, the user interface 118D may comprise slidable shielding material that can be moved (e.g., slid) on or off of an IC chip of a card to expose or hide the IC chip (e.g., slid on or off the area where internal card reader 116D is shown). In this way, a cardholder may enable communications between the IC of a contactless card and an external card reader by turning cardholder sleeve 614 to slot 615D and sliding the shielding material off of the IC chip of the card.

In some examples, each of transceivers 116A-116E may be configured to have different communication ranges. For example, slots 615A-615C of cardholder sleeve 614 may include transceivers 120A-120C with longer communication ranges (e.g., transceivers 120A-120C may each include or be coupled to long-range antennas) than transceivers 120D-120E with shorter communication ranges (e.g., transceivers 120D-120E may each include or be coupled to short-range antennas) at slots 615D-615E (or vice versa). In some examples, the transceiver with longer range may include a battery. In some examples, the communications ranges may progressively shorten from transceiver 120A of slot 615A to transceiver 120E of slot 615E (or vice versa). Either way, in one example, a cardholder may select user interface 118E and hold transceiver 120E on the surface of (e.g., touching the surface) an external card reader for the external card reader to receive information read by internal card reader 116E, while a cardholder may be able to select user interface 118A and hold transceiver 120A several feet from an external card reader for the external card reader to receive information ready by internal card reader 116A. In this way, a cardholder may insert financial cards (e.g., credit cards, debit cards) or other high-risk cards (e.g., cards containing sensitive data) in slots with shorter communication ranges (e.g., slots 615D-615E) and access cards (e.g., parking garage access card) or other low-risk cards (e.g., card containing less sensitive data) in slots with longer communication ranges (e.g., slots 615A-615C). The cardholder may thus selectively enhance security against skimming for some cards (e.g., high-risk cards) while enhancing convenience or utility for other cards (e.g., low-risk cards).

In some examples, cardholder sleeve 615 may not include any transceivers 120. Instead, the shielding material within each slot 615 may be configured to become electronically transparent when user input is entered a corresponding user interface 118. For example, this shielding material may allow a cardholder to turn on or off the electronic opaqueness of the shielding material on all or part of major surface 602D and/or 604D and allow direct communication between an external card reader and a contactless card held within slot 615D. In other words, the shielding material would allow the contactless card held in 615D to directly receive interrogating signals from an external card reader and to directly transmit data to that external card reader.

Figure 7:
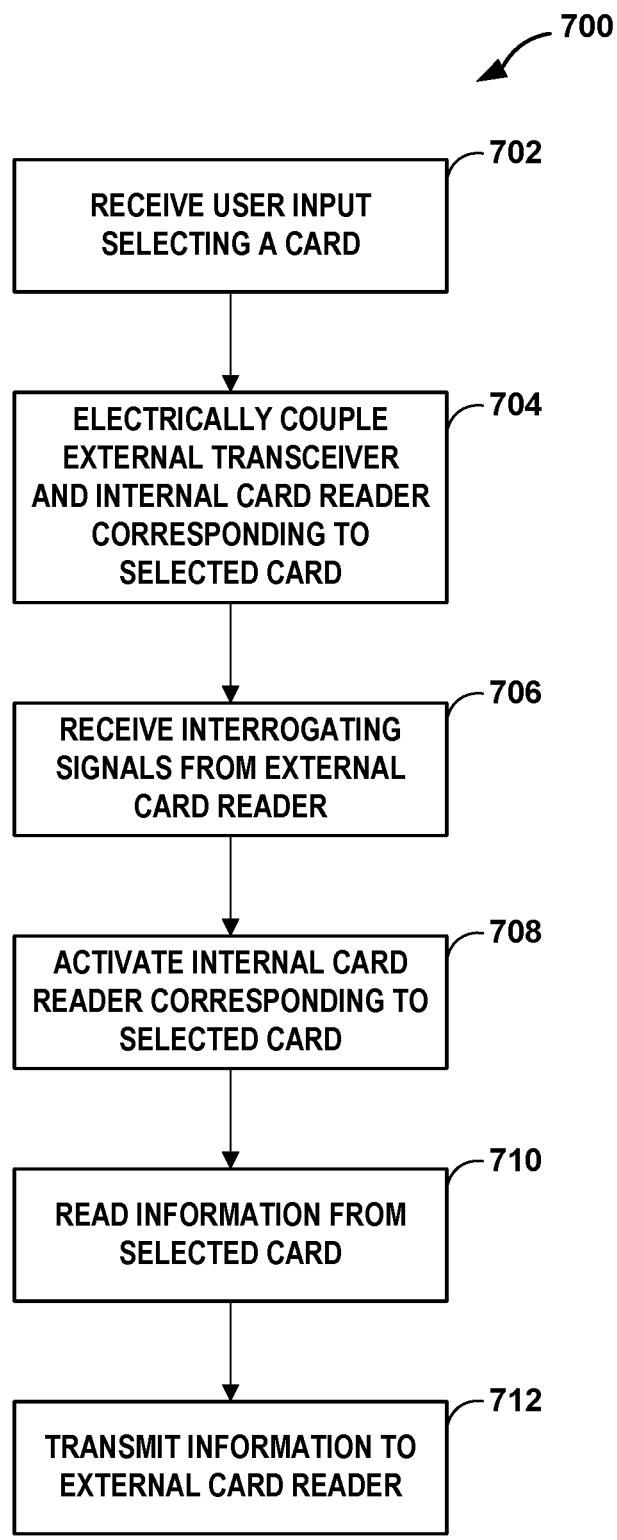
FIG. 7 is a flowchart illustrating an example method of reading and transmitting card information using a cardholder sleeve with selectable wireless communication capabilities, in accordance with the techniques of this disclosure.

FIG. 7 is a flowchart illustrating an example method 700 of reading and transmitting card information with a cardholder sleeve in accordance with the techniques of this disclosure. For example, method 700 may be performed at a cardholder sleeve comprising a plurality of slots (where each slot of the plurality of slots is configured to hold a card with an IC chip) (e.g., slots 115 of FIGS. 1, 3, 5 and slots 615 of FIG. 6), shielding material embedded in each of the plurality of slots to block interrogating signals (e.g., shielding material 302 of FIG. 3), a plurality of internal card readers (where each of the plurality of internal card readers is positioned at each of the plurality of slots) (e.g., internal card reader 116 of FIGS. 1, 3-6), at least one transceiver (e.g., transceiver 120 of FIGS. 1, 3-6); and at least one user interface (e.g., user interface 118 of FIGS. 1, 3-6) configured to receive input from a user to select a respective card held in a respective slot of the plurality of slots (e.g., select the respective slot or the select the internal card reader in the respective slot) by electrically coupling the transceiver to a respective internal card reader positioned at the respective slot.

In some examples, the shielding material is embedded in a first side of each of the plurality of slots and each of the plurality of internal card readers is positioned at a second side, opposite the first side, of each of the plurality of slots. In other examples, the shielding material is embedded in a first side of each of the plurality of slots, each of the plurality of internal card readers is positioned at a second side, opposite the first side, of each of the plurality of slots, and a user interface is configured on the second side of each of the plurality of slots. The transceiver may have longer range than any of the IC chips of the cards in the cardholder sleeve. In some examples, a transceiver may be positioned on the second side of each of the plurality of slots. It is understood that method 700 may be performed with any of cardholder sleeves 114 or 614 of FIG. 1 or 3-6 or other cardholder sleeves with different configurations.

User input selecting a card held in one the plurality of lots of a cardholder sleeve is received at the at least one user interface (702). For example, a user may enter user input at a button or switch of the cardholder sleeve to select a slot or an internal card reader corresponding to the desired card (e.g., as described above with reference to FIGS. 1, 3-6). In response to receiving the user input, the user interface may electronically couple the transceiver and the internal card reader corresponding to the selected card (704) (e.g., as described above with reference to FIGS. 1, 3-6).

The transceiver may receive interrogating signals from an external card reader or POS device (706) (e.g., as described above with reference to FIGS. 1, 3-6). In some examples, the transceiver may receive interrogating signals before the user interface receives the user input or before the user interface electrically couples the transceiver and the internal card reader corresponding to the selected card. In other examples, the transceiver may only receive interrogating signals after the user interface receives the user input and after the user interface electrically couples the transceiver and the internal card reader corresponding to the selected card. In other words, the user interface may be configured to activate the transceiver (e.g., by coupling the transceiver and an internal card reader). In response to receiving interrogating signals from the external card reader, the transceiver may activate the respective internal card reader (708) and read information from the IC chip of the respective card (710) (e.g., as described above with reference to FIGS. 1, 3-6). In other words, only the respective internal card reader is activated to read information from a card in response to the transceiver receiving interrogating signals in this example because the respective internal card reader would be the only internal card reader to be coupled to the transceiver in this example. The internal card readers may be contactless card readers configured to perform NFC communications with the IC chip of the selected card. In some examples, the internal card readers are contact card readers that are configured to contact the IC chips on the cards in the slots (e.g., contact a pattern of metal contacts on a card to electronically couple the contact card reader to the IC of the card) to read information from the IC chip of the selected card. Either way, the transceiver transmits (e.g., repeats) the information read from the IC chip of the respective card to the external card reader (712). Once the card information is received, the external card reader may instantiate a transaction (e.g., with a financial institution server) or make an access determination based on the received information. Further, instantiating a transaction may include the external card reader providing relevant information to a teller, such as a name of the cardholder, identified preferences of the cardholder such as the use of paper receipts, or the like. In the examples where the cardholder sleeve includes a transceiver on a second side of each of the plurality of slots, these transceivers may have the same or different ranges (e.g., the transceivers may be coupled to antennas with the same or different ranges). For example, a first transceiver coupled to a first antenna corresponding to a first slot may have a longer range than a second transceiver coupled to second antenna corresponding to a second slot (e.g., any slot other than the first slot).

Techniques of this disclosure may provide one or more technical advantages. For example, certain techniques of this disclosure may, in some instances, provide a technical solution to securing financial (e.g., debit, credit) cards and/or access (e.g., transit, employee) cards. For example, a cardholder sleeve in accordance with the techniques of this disclosure may include two or more slots surrounded by shielding material to shield or block the communication features of cards held within the two or more slots from skimming and prevent interference with other cards in the sleeve. Moreover, including internal card readers in each of the slots and a transceiver that can be enabled to read and transmit information from a card selected via a user interface allows cardholders to use each card in the cardholder sleeve without having to remove the respective card from the sleeve. Further, the transceiver may have a longer range than antennas of contactless cards or enable wireless communication for contact cards and, thus, enhance convenience or utility for both contactless and contact cards.

Various examples have been described. These and other examples are within the scope of the following claims.

What is claimed is:

1. A cardholder sleeve comprising:
   a plurality of slots, wherein each slot of the plurality of slots is configured to hold a card with an integrated circuit chip;
   shielding material embedded in each of the plurality of slots to block interrogating signals;
   a plurality of internal card readers, wherein each of the plurality of internal card readers corresponds to a different one of the plurality of slots;
   a transceiver;
   a plurality of slot user interfaces, wherein each of the plurality of slot user interfaces corresponds to a different one of the plurality of slots, and wherein each of the plurality of slot user interfaces is configured to receive input from a user to select the card held in the corresponding one of the plurality of slots; and
   a switch configured to, in response to receiving the input from the user from one of the plurality of slot user interfaces, electrically couple the internal card reader of the corresponding one of the plurality of slots to the transceiver,
   wherein the transceiver is configured to:
      in response to receiving interrogating signals from an external card reader, activate the internal card reader electrically coupled to the transceiver to read information from the integrated circuit chip of the selected card, and
      transmit the information to the external card reader.

2. The cardholder sleeve of claim 1, wherein only the internal card reader electrically coupled to the transceiver is activated in response to the transceiver receiving the interrogating signals.

3. The cardholder sleeve of claim 1, wherein the internal card reader of the plurality of internal card readers is configured to perform near-field communication (NFC) with the integrated circuit chip of the card to read the information from the integrated circuit chip.

4. The cardholder sleeve of claim 1, wherein the internal card reader corresponding to the one of the plurality of slots holding the selected card is configured to contact the integrated circuit chip of the card to read the information from the integrated circuit chip.

5. The cardholder sleeve of claim 1, wherein the switch is further configured to complete the electrical coupling between the transceiver and the respective internal card reader of the plurality of internal card readers.

6. The cardholder sleeve of claim 1, wherein the at least one user interface is a button configured to toggle the electrical coupling between the transceiver and each internal card reader of the plurality of internal card readers.

7. The cardholder sleeve of claim 1, wherein the at least one user interface is configured to activate the transceiver to receive the interrogating signals.

8. The cardholder sleeve of claim 1, wherein the shielding material is embedded in a first side of each of the plurality of slots and each internal card reader of the plurality of internal card readers is positioned at a second side, opposite the first side, of each of the plurality of slots.

9. The cardholder sleeve of claim 8, wherein each slot user interface of the plurality of slot user interfaces is positioned at the second side of each of the plurality of slots.

10. The cardholder sleeve of claim 1, wherein the transceiver has a longer range than an antenna of the integrated circuit chip of the selected card.

11. The cardholder sleeve of claim 1, wherein the cardholder sleeve comprises a booklet with a plurality of sheets corresponding to the plurality of slots.

12. A method comprising:
receiving, at one of a plurality of user interfaces of a cardholder sleeve comprising a plurality of slots, wherein each of the plurality of user interfaces corresponds to a different one of the plurality of slots, user input to select a card held in the corresponding one of the plurality of slots;
electrically coupling one of a plurality of internal card readers corresponding to the one of the plurality of slots to a transceiver of the cardholder sleeve;
receiving, at the transceiver of the cardholder sleeve, interrogating signals from an external card reader;
in response to receiving the interrogating signals, activating the electrically coupled internal card reader to read information from the selected card held in the corresponding one of the plurality of slots; and
transmitting, by the transceiver of the cardholder sleeve, the information to the external card reader.

13. The method of claim 12, further comprising, performing, by the electrically coupled internal card reader, near-field communication (NFC) with the integrated circuit chip of the selected card to read the information from the integrated circuit chip.

14. The method of claim 12, wherein the electrically coupled internal card reader is configured to contact the integrated circuit chip of the selected card, the method further comprising, upon activating the electrically coupled internal card reader, reading the information from the integrated circuit chip of the respective card.

15. The method of claim 12, further comprising activating the transceiver to receive the interrogating signals.

16. The method of claim 12, wherein the transceiver has a longer range than an antenna of the integrated circuit chip of the respective card.

17. A cardholder sleeve comprising:
a plurality of slots, wherein each slot of the plurality of slots is configured to hold a card with an integrated circuit chip;
shielding material embedded in each of the plurality of slots to block interrogating signals;
a plurality of internal card readers, wherein each of the plurality of internal card readers is positioned at a different one of the plurality of slots, including a first internal card reader positioned at a first slot and a second internal card reader positioned at a second slot;
a plurality of transceivers, wherein each of the plurality of transceivers is positioned at a different one of the plurality of slots;
a plurality of slot user interfaces, wherein each of the plurality of slot user interfaces corresponds to a different one of the plurality of slots, and wherein each of the plurality of slot user interfaces is configured to receive input from a user to select a card held in the corresponding one of the plurality of slots; and
a switch configured to, in response to receiving the input from the user from one of the plurality of slot user interfaces, electrically couple the internal card reader of the corresponding one of the plurality of slots to the corresponding one of the plurality of transceivers,
wherein each of the plurality of transceivers is configured to:
in response to receiving interrogating signals from an external card reader, activate only the internal card reader electrically coupled to the corresponding one of the plurality of transceivers to read information from the integrated circuit chip of the selected card, and
transmit the information to the external card reader.

18. The cardholder sleeve of claim 17, wherein the plurality of slot transceivers includes a first slot transceiver corresponding to a first slot and a second slot transceiver corresponding to a second slot, and wherein the first slot transceiver corresponding to the first slot has a longer range than the second slot transceiver corresponding to the second slot.

19. The cardholder sleeve of claim 17, wherein the cardholder sleeve comprises a booklet with a plurality of sheets corresponding to the plurality of slots.

* * * * *